(12) United States Patent
Kwon et al.

(10) Patent No.: US 9,829,745 B2
(45) Date of Patent: Nov. 28, 2017

(54) CURVED DISPLAY DEVICE WITH LIGHT SOURCE FIXED BY BOTTOM PORTION OF CONTAINER CONTAINING THE LIGHT SOURCE

(71) Applicant: Samsung Display Co., Ltd., Yongin-si, Gyeonggi-Do (KR)

(72) Inventors: Myung-Seok Kwon, Seongnam-si (KR); Sojeong La, Suwon-si (KR); Seokhyun Nam, Seoul (KR); Eui Jeong Kang, Suwonsi (KR); Jung-Hyun Yang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/812,725

(22) Filed: Jul. 29, 2015

(65) Prior Publication Data
US 2016/0161085 A1 Jun. 9, 2016

(30) Foreign Application Priority Data

Dec. 5, 2014 (KR) .................. 10-2014-0173902

(51) Int. Cl.
*G02F 1/1335* (2006.01)
*G02F 1/1333* (2006.01)

(52) U.S. Cl.
CPC .. *G02F 1/133608* (2013.01); *G02F 1/133305* (2013.01); *G02F 1/133605* (2013.01)

(58) Field of Classification Search
CPC ...... F16B 3/00; F16B 3/06; F16B 5/00; F21V 19/004; G02F 1/133602; G02F 1/133603;
(Continued)

(56) References Cited

U.S. PATENT DOCUMENTS 4,283,216 A 8/1981 Brereton
6,464,378 B1 * 10/2002 Reed .................. F21V 7/10
362/297

(Continued)

FOREIGN PATENT DOCUMENTS

JP 2012-118440 A 6/2012
KR 10-0937704 B1 8/2004
(Continued)

*Primary Examiner* — Andrew Coughlin
*Assistant Examiner* — Michael Chiang
(74) *Attorney, Agent, or Firm* — H.C. Park & Associates, PLC

(57) ABSTRACT

A curved display device includes a display panel curved along a first direction and a backlight assembly including a light source unit having light sources, light source substrates electrically connected to the light sources, a containing member accommodating the light source unit and including a bottom portion curved along the first direction and a fixing portion coupled to the light source substrates to fix the light source substrates to the bottom portion, and the fixing portion is defined by cutting and bending a portion of the bottom portion, and a reflection sheet comprising a sheet bottom portion and a plurality of sidewalls extending from the sheet bottom portion, a portion of the sidewalls is integrally formed with the sheet bottom portion, and the other portion of the sidewalls is coupled to the sheet bottom portion.

12 Claims, 7 Drawing Sheets

(58) Field of Classification Search
CPC ......... G02F 1/133604; G02F 1/133606; G02F 1/133608; G02F 1/133609; G02F 1/133611; G02B 6/0031
USPC .......................... 362/97.1–97.3, 609; 349/67
See application file for complete search history.

(56) References Cited

U.S. PATENT DOCUMENTS

| | | | |
|---|---|---|---|
| 7,192,177 | B2 | 3/2007 | Chang et al. |
| 7,207,710 | B2 | 4/2007 | Kim |
| 7,434,979 | B2 | 10/2008 | Kim |
| 7,665,859 | B2 * | 2/2010 | Lim ................ G02F 1/133603 349/67 |
| 7,880,831 | B2 * | 2/2011 | Hsiao ............... G02F 1/133608 349/70 |
| 8,297,823 | B2 | 10/2012 | Cho et al. |
| 8,373,816 | B2 | 2/2013 | Kim et al. |
| 2005/0265020 | A1 * | 12/2005 | Kim ................ G02F 1/133604 362/225 |
| 2008/0084626 | A1 * | 4/2008 | Blood ..................... F21V 7/22 359/883 |
| 2012/0140149 | A1 | 6/2012 | Sakita et al. |
| 2013/0094187 | A1 | 4/2013 | Kamada |
| 2014/0009914 | A1 | 1/2014 | Cho et al. |
| 2014/0347864 | A1 * | 11/2014 | Kawada ............... F21V 29/004 362/294 |

FOREIGN PATENT DOCUMENTS

| | | | |
|---|---|---|---|
| KR | 10-0782218 B1 | 12/2007 | |
| KR | 10-1494310 B1 | 5/2010 | |
| KR | 10-2013-0055338 A | 5/2013 | |
| KR | 10-2014-0007202 A | 1/2014 | |
| KR | 10-2014-0012478 A | 2/2014 | |
| WO | WO 2013172538 A1 * | 11/2013 | ........... G02F 1/1333 |

* cited by examiner

CURVED DISPLAY DEVICE WITH LIGHT SOURCE FIXED BY BOTTOM PORTION OF CONTAINER CONTAINING THE LIGHT SOURCE

CLAIM OF PRIORITY

This U.S. non-provisional patent application claims the priority of and all the benefits accruing under 35 U.S.C. §119 of Korean Patent Application No. 10-2014-0173902, filed on Dec. 5, 2014 in the Korean Intellectual Property Office (KIPO), the contents of which are hereby incorporated by reference in its entirety.

BACKGROUND OF THE INVENTION

1. Field of disclosure

The present disclosure relates to a curved display device. More particularly, the present disclosure relates to a curved display device having a backlight assembly.

2. Description of the Related Art

In general, a display device includes a display panel displaying an image and a backlight assembly providing a light to the display panel.

The display panel includes a first substrate including pixels disposed thereon, a second substrate facing the first substrate, and an image display layer interposed between the first and second substrates. The image display layer is driven by the pixels, and a transmittance of the light passing through the image display layer is controlled by the image display layer, to thereby display the image on the display panel. The image display layer is a liquid crystal layer, an electrowetting layer, or an electrophoretic layer.

The display device has a substantially flat shape, however, a curved display device having a curved surface shape has been developed recently. The curved display device provides the image having improved three-dimensional effect, sense of immersion (or immersiveness), and presence to a viewer.

SUMMARY OF THE INVENTION

The present disclosure provides a curved display device including a backlight assembly having improved fixing force between a light source substrate and a containing member, which are curved to correspond to a curved shape of a display panel.

The present disclosure provides a curved display device including a backlight assembly having improved engagement strength between a reflection sheet and a containing member.

Embodiments of the inventive concept provide a curved display device including a display panel curved along a first direction and a backlight assembly providing a light to the display panel. The backlight assembly includes a light source unit comprising a plurality of light sources emitting the light and a plurality of light source substrates electrically connected to the light sources and a containing member accommodating the light source unit. The containing member includes a bottom portion curved along the first direction and a fixing portion defined by cutting and bending a portion of the bottom portion. The fixing portion is coupled to the light source substrates to fix the light source substrates to the bottom portion.

The fixing portion is defined by cutting a portion of the bottom portion and bending the cut portion of the bottom portion.

The fixing portion includes an engaging groove defined by the bent portion, and an end portion of each light source substrate is engaged to the engaging groove.

Each of the light source substrates extends in a second direction crossing the first direction, and the light source substrates are arranged in the first direction on the bottom portion.

The first direction is substantially perpendicular to the second direction.

Embodiments of the inventive concept provide a curved display device including a display panel curved along a first direction and a backlight assembly providing a light to the display panel. The backlight assembly includes a light source unit including a plurality of light sources emitting the light and a plurality of light source substrates electrically connected to the light sources, a containing member accommodating the light source unit, and a reflection sheet disposed on the containing member to cover the light source substrates and including holes formed therethrough to accommodate the light sources. The reflection sheet includes a sheet bottom portion and a plurality of sidewalls extending from the sheet bottom portion, a portion of the sidewalls is integrally formed with the sheet bottom portion, and the other portion of the sidewalls is coupled to the sheet bottom portion.

The sidewalls include a first sidewall, a second sidewall, a third sidewall, and a fourth sidewall, the first sidewall, the sheet bottom portion, and the second sidewall are arranged in the first direction to be integrally formed with each other, the third sidewall, the sheet bottom portion, and the fourth sidewall are arranged in the second direction, and the third and fourth sidewalls are coupled to the sheet bottom portion.

The sheet bottom portion includes a protrusion portion extending from the sheet bottom portion, and each of the third and fourth sidewalls includes an engaging hole formed therethrough to be coupled to the protrusion portion.

The protrusion portion includes a head having a first width and a connector connecting the head and the sheet bottom portion and having a second width smaller than the first width. The engaging hole is smaller than the first width and greater than the second width.

The head is inserted into the engaging hole after penetrating through the engaging hole smaller than the first width, and the head is caught by the engaging hole to be fixed to the engaging hole.

The protrusion portion has a polygonal shape, and a size of the protrusion portion and a number of the protrusion portions increase as a curvature radius of the display panel becomes greater.

The third sidewall, the bottom portion, and the fourth sidewall are curved in the first direction.

According to the above, the fixing force between the light source substrate and the containing member is improved, and the reflection sheet is integrally formed as a single unitary and individual unit to improve the coupling property thereof.

In more detail, a plurality of engaging holes are defined in sidewalls of the reflective sheet, a plurality of protrusion portions are defined in the sheet bottom portion, and the plurality of protrusions are coupled to the plurality of engaging holes. Thus, the coupling property of the reflection sheet is improved.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
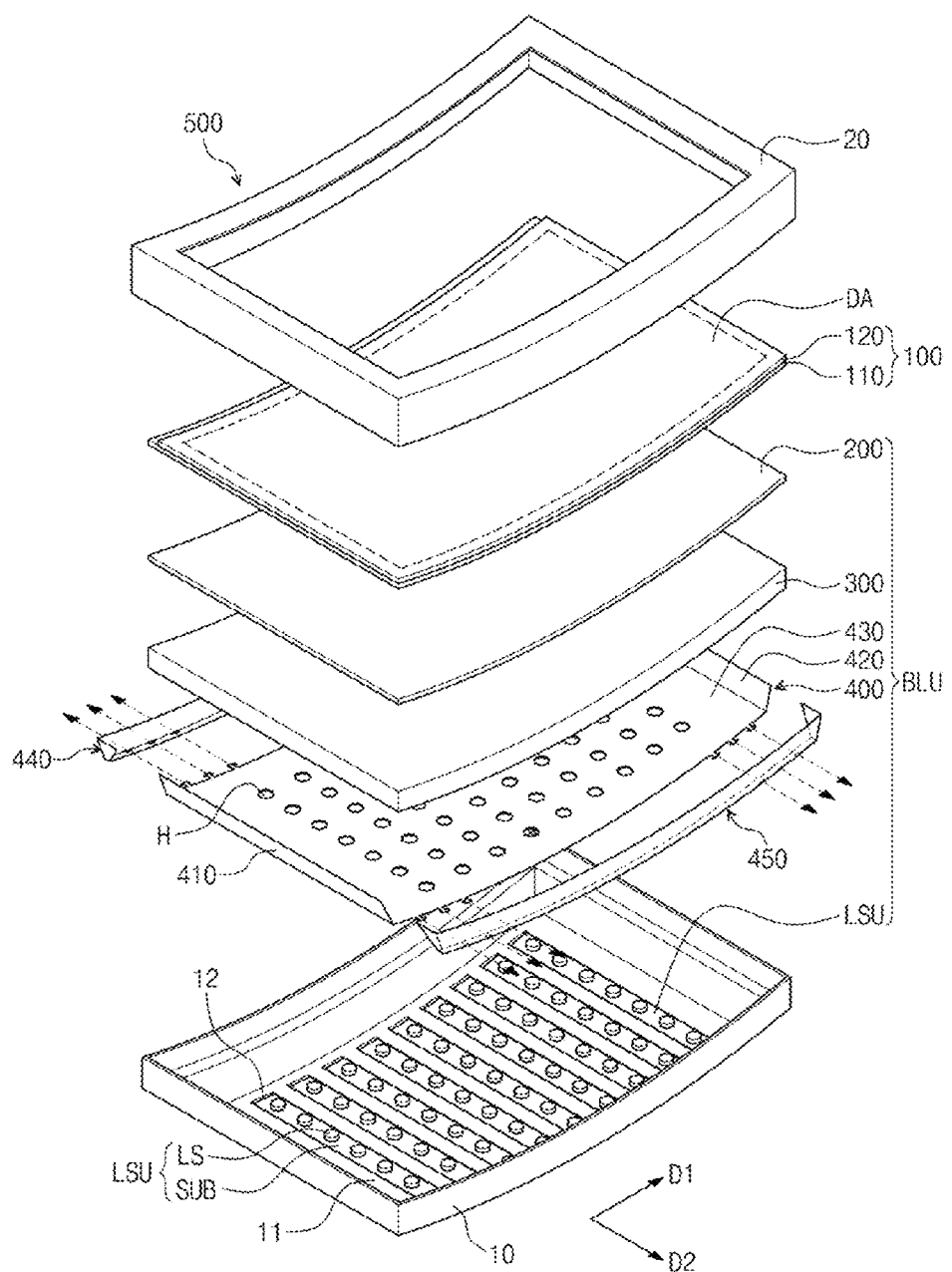
FIG. 1 is an exploded perspective view showing a curved display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a curved display device 500 according to an exemplary embodiment of the present disclosure.

Referring to FIG. 1, the curved display device 500 has long sides curved along a first direction D1 and short sides extending in a second direction D2 crossing the first direction D1.

The display device 500 includes a display area DA defined by the broken line shown on a second substrate 120 displaying an image (FIG. 1), and the display area DA has a curved surface with a predetermined curvature along the first direction D1.

The display device 500 includes a display panel 100, a backlight assembly BLU, a containing member 10, and a covering member 20. Each of the display panel 100, the backlight assembly BLU, the containing member 10, and the covering member 20 has long sides curved along the first direction D1 and short sides extending in the second direction D2. Thus, each of the display panel 100, the backlight assembly BLU, the containing member 10, and the covering member 20 has a curved surface curved along the first direction D1.

In the present exemplary embodiment, the display panel 100 is a liquid crystal display panel including a first substrate 110, a second substrate 120 facing the first substrate 110, and a liquid crystal layer interposed between the first substrate 110 and the second substrate 120.

However, the display panel 100 should not be limited to the liquid crystal display panel. That is, the display panel 100 may be an electrophoretic display panel or an electrowetting display panel.

Each of the first substrate 110 and the second substrate 120 of the display panel 100 may be a glass substrate or a plastic substrate.

The covering member 20 is disposed on the display panel 100 to cover the display panel 100, the backlight assembly BLU, and the containing member 10.

The covering member 20 has an opening formed therethrough to correspond to the display area DA and covers an edge of the display panel 100.

Thus, the edge of the display panel 100 is covered by the covering member 20 and the display area DA is exposed to an exterior environment.

In the present exemplary embodiment, the backlight assembly BLU includes a light source unit LSU, an optical sheet 200, a diffusion plate 300, and a reflection sheet 400. Each of the optical sheet 200, the diffusion plate 300, and the reflection sheet 400 has long sides curved along the first direction D1 and short sides extending along the second direction D2.

The diffusion plate 300 is disposed under the optical sheet 200. The diffusion plate 300 may include a diffusion material distributed therein or a diffusion layer coated thereon. The diffusion plate 300 diffuses a light provided from a plurality of light sources LS, which is disposed under the diffusion plate 300, and provides the diffused light to the optical sheet 200.

The reflection sheet 400 is disposed under the diffusion plate 300. The reflection sheet 400 includes a plurality of holes H. The light sources LS are respectively accommodated in the holes H and the light emitted from the light sources LS is provided to the diffusion plate 300.

The reflection sheet 400 includes a sheet bottom portion 430, a first sidewall 410, a second sidewall 420, a third sidewall 440, and a fourth sidewall 450. The sheet bottom portion 430, the first sidewall 410, and the second sidewall 420 are integrally formed, and the third sidewall 440 and the fourth sidewall 450 are coupled to the sheet bottom portion 430. Each of the first sidewall 410 and the second sidewall 420 is bent from the sheet bottom portion 430.

The optical sheet 200 is disposed under the display panel 100. Although not shown in FIG. 1, the optical sheet 200 may include a diffusion sheet, a prism sheet disposed on the diffusion sheet, and a protection sheet disposed on the prism sheet.

The diffusion sheet diffuses the light provided from the diffusion plate 300. The prism sheet condenses the light diffused by the diffusion sheet to a direction substantially perpendicular to a plane surface of the display panel 100. Thus, the light passing through the prism sheet travels in the direction substantially perpendicular to the plane surface of the display panel 100 by the prism sheet. Therefore, a front brightness is improved by the prism sheet. The protection sheet protects the prism sheet that is vulnerable to scratches.

In the present exemplary embodiment, the backlight assembly BLU is disposed under the display panel 100 to provide the light to the display panel 100, and the display panel 100 displays the image using the light provided from the backlight assembly BLU.

The backlight assembly BLU includes a light source unit LSU, and the light source unit LSU includes a plurality of light source substrates SUB and the light sources LS mounted on the light source substrates SUB.

Each light source substrate SUB includes the light sources LS mounted thereon, and the light sources LS receive a power source from the light source substrate SUB to emit the light. The light sources LS are arranged in a straight line shape and spaced apart from each other at regular intervals on the containing member 10.

Each light source substrate SUB extends in the second direction D2 crossing the first direction D1, the light source substrates SUB are arranged in the first direction D1 on a bottom portion 11, and the first direction D1 is substantially perpendicular to the second direction D2.

In the present exemplary embodiment, the containing member 10 is disposed under the backlight assembly BLU to accommodate the backlight assembly BLU and the containing member 10 includes the bottom portion 11 and a fixing portion 12.

The bottom portion 11 has long sides curved along the first direction D1 and short sides extending in the second direction D2. The bottom portion 11 has a curved surface curved in the first direction D1 with a predetermined curvature and has a substantially flat shape in the second direction D2.

Figure 2A:
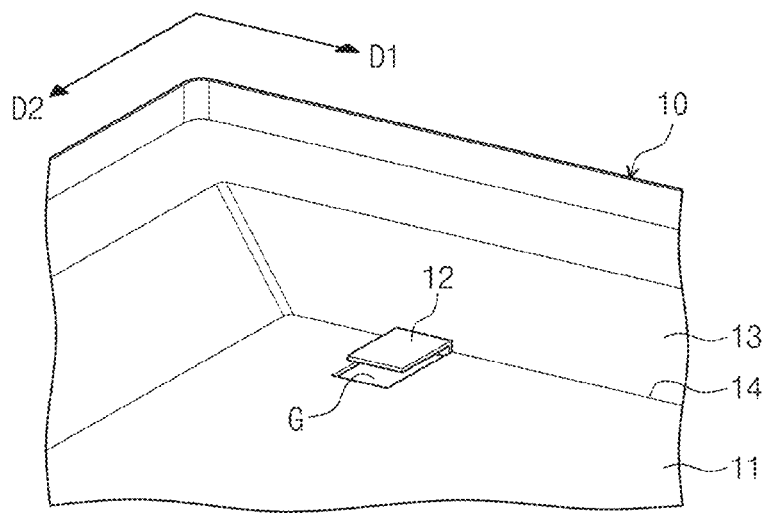
FIG. 2A is a perspective view showing light source substrates and a containing member shown in FIG. 1 before they are coupled to each other.
Figure 2B:
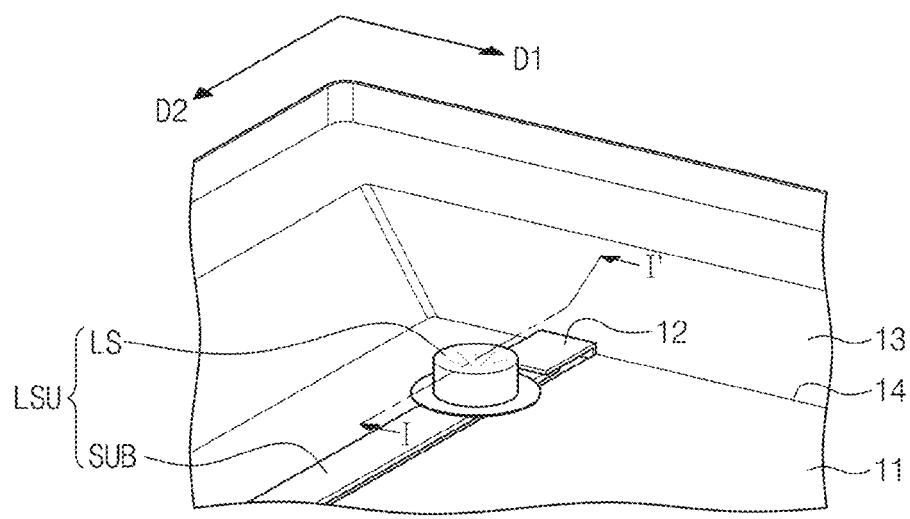
FIG. 2B is a perspective view showing the light source substrates and the containing member shown in FIG. 2A when they are coupled to each other.
Figure 2C:
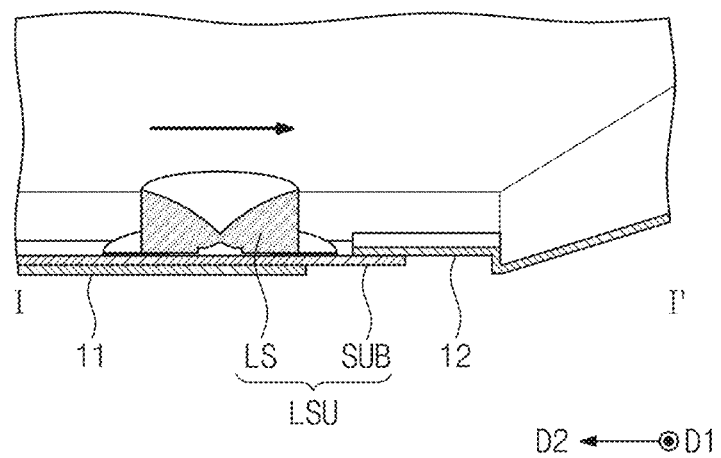
FIG. 2C is a cross-sectional view taken along a line I-I' of FIG. 2B.

FIG. 2A is a perspective view showing the containing member before the containing member is coupled to the light source substrate shown in FIG. 1, FIG. 2B is a perspective view showing the containing member after the containing member is coupled to the light source substrate shown in FIG. 1, and FIG. 2C is a cross-sectional view taken along a line I-I' of FIG. 2B.

Referring to FIG. 2A, the bottom portion 11 of the containing member 10 includes a plurality of fixing portions 12.

The fixing portion 12 is defined by cutting a portion of the bottom portion 11 and bending the cut portion. In detail, the cut portion of the bottom portion 11 is bent in an upper direction and then bent in a side direction (i.e. the cut portion is bent twice in opposite directions) such that each of the fixing portion 12 has a hook shape in which an engaging groove G is defined. However, the shape of the fixing portion 12 should not be limited to the hook shape. According to embodiment, the fixing portion 12 may have another hook shape protruded from the bottom portion 11. In addition, the fixing portion 12 with the hook shape may be disposed at a boundary area 14 between the bottom portion 11 and a side wall 13 of the containing member 10, which is bent from the bottom portion 11.

Referring to FIGS. 2B and 2C, the light source substrate SUB of the light source unit LSU is coupled to the fixing portion 12.

In more detail, an end portion of the light source substrate SUB is inserted into the engaging groove G defined in the fixing portion 12 in the direction indicated by the arrow shown on the light source LS, and the inserted light source substrate SUB and the fixing portions 12 have an integrated shape. As shown in figures, a bottom surface of the light source substrate SUB is firstly fixed to the containing member 10 by a double-sided adhesive tape. The end portion of the light source substrate SUB is coupled to the fixing portion 12 in the direction indicated by the arrow shown on the light source LS in addition to the use of the double-sided adhesive tape, and thus a fixing force between the light source substrate SUB and the fixing portion 12 are prevented from being lowered.

The light source substrate SUB is inserted into the engaging groove G disposed above an upper surface of the bottom portion 11, and the light source unit LSU is electrically connected to the light source substrate SUB on the light source substrate SUB.

Figure 3:
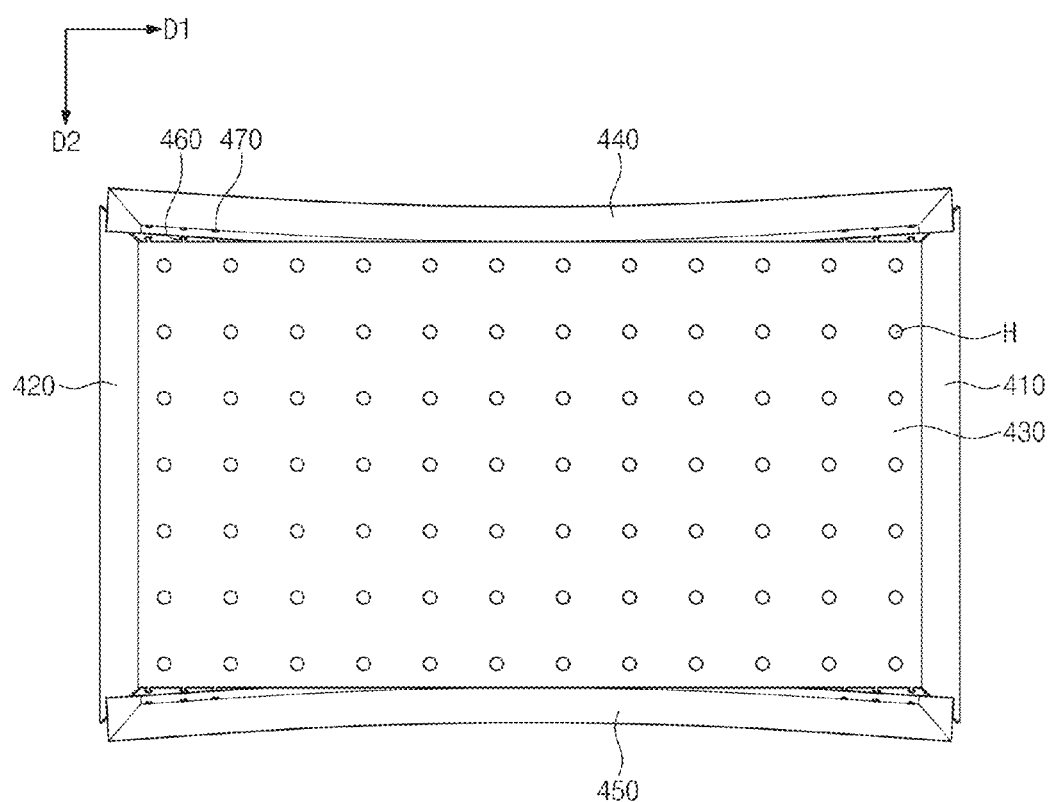
FIG. 3 is a plan view showing a coupling state of a bottom portion and sidewalls of a reflection sheet of a curved display device according to another exemplary embodiment of the present disclosure.

FIG. 3 is a plan view showing a coupling state of a reflection sheet of a curved display device according to another exemplary embodiment of the present disclosure.

Referring to FIG. 3, the reflection sheet 400 includes the sheet bottom portion 430 covering the bottom portion 11 of the containing member 10, the first sidewall 410 and the second sidewall 420 extending from the sheet bottom portion 430, and the third sidewall 440 and the fourth sidewall 450 coupled to the sheet bottom portion 430.

The second sidewall 420, the sheet bottom portion 430, and the first sidewall 410 are integrally formed with each other and arranged in the first direction D1 to be substantially parallel to each other, and the third sidewall 440 and the fourth sidewall 450 are coupled to the sheet bottom portion 430 and arranged in parallel in the second direction D2 to be substantially parallel to each other.

The first and second sidewalls 410 and 420 including the sheet bottom portion 430 is coupled to the third and fourth sidewalls 440 and 450, and the sheet bottom portion 430 is the first direction D1.

The sheet bottom 430 is includes the hole H to respectively accommodate the light source unit LSU arranged in the containing member 10.

Each of the holes H accommodates a corresponding light source unit of the light source units LSU, and the light sources LS, which have the same shape as the holes H, are respectively inserted into the holes H to provide the light to the diffusion plate 300 disposed on the reflection sheet 400.

The third sidewall 440 and the fourth sidewall 450 are coupled to the sheet bottom portion 430 from which the first sidewall 410 and the second sidewall 420 extend, and thus the first, second, third, and fourth sidewalls 410, 420, 440, and 450 have the integrated shape with the sheet bottom portion 430.

A plurality of protrusion portions 460 is disposed at each corner of the sheet bottom portion 430, which is disposed adjacent to the third and fourth sidewalls 440 and 450, and the protrusion portions 460 are coupled to a plurality of engaging holes 470 formed through the third and fourth sidewalls 440 and 450.

Thus, the coupling stability of the reflection sheet 400 is improved since the reflection sheet 400 includes the protrusion portions 460 coupled to the engaging holes 470 without using a double-sided adhesive tape. Consequently, even though the curved display device 500 is used for a long period of time, the coupling stability of the reflection sheet 400 is prevented from being deteriorated. In addition, a manufacturing cost is reduced, a manufacturing process is simplified, and an overall production time is reduced, to thereby improve productivity.

Figure 4A:
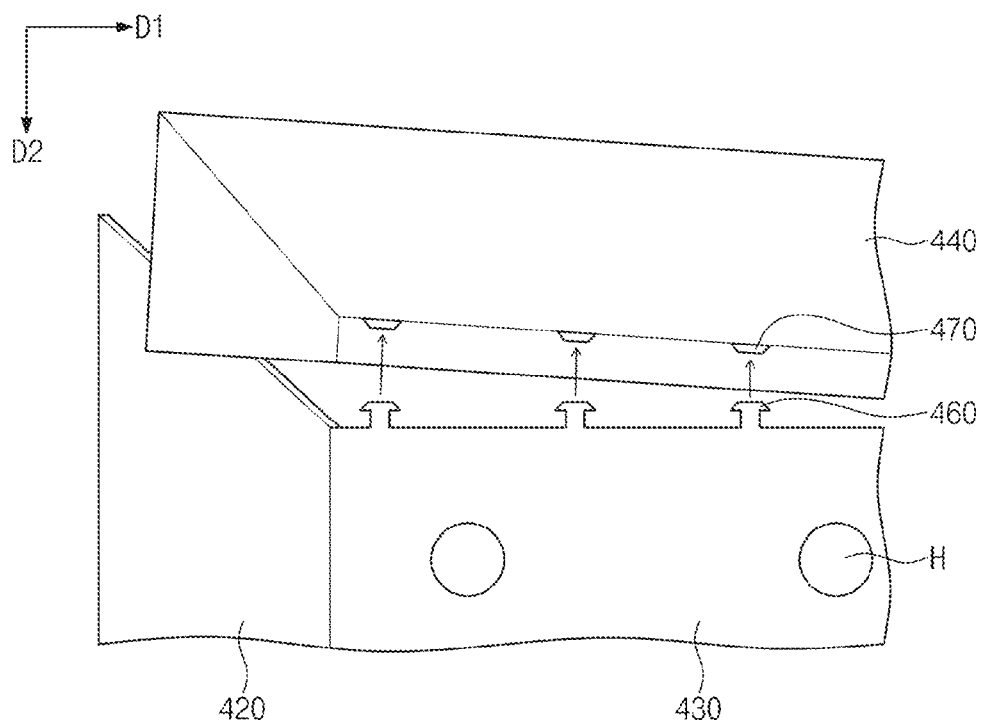
FIG. 4A is an enlarged perspective view showing the coupling state of a bottom portion and sidewalls of the reflection sheet shown in FIG. 3.

FIG. 4A is an enlarged perspective view showing the coupling state of the reflection sheet shown in FIG. 3.

Referring to FIG. 4A, the reflection sheet 400 includes the protrusion portions 460 disposed on the sheet bottom portion 430 and the engaging holes 470 formed through the third sidewall 440 and the fourth sidewall 450 (refer to FIG. 3) to be coupled to the protrusion portions 460. The engaging holes 470 of the third and fourth sidewalls 440 and 450 are disposed at positions corresponding to the protrusion portions 460 of the sheet bottom portion 430 and coupled to the protrusion portions 460.

The third and fourth sidewalls 440 and 450 are coupled to the sheet bottom portion 430 from which the first and second sidewalls 410 and 420 extend, and the third and fourth sidewalls 440 and 450 are coupled to the sheet bottom portion 430 while being curved in a predetermined curvature.

Figure 4B:
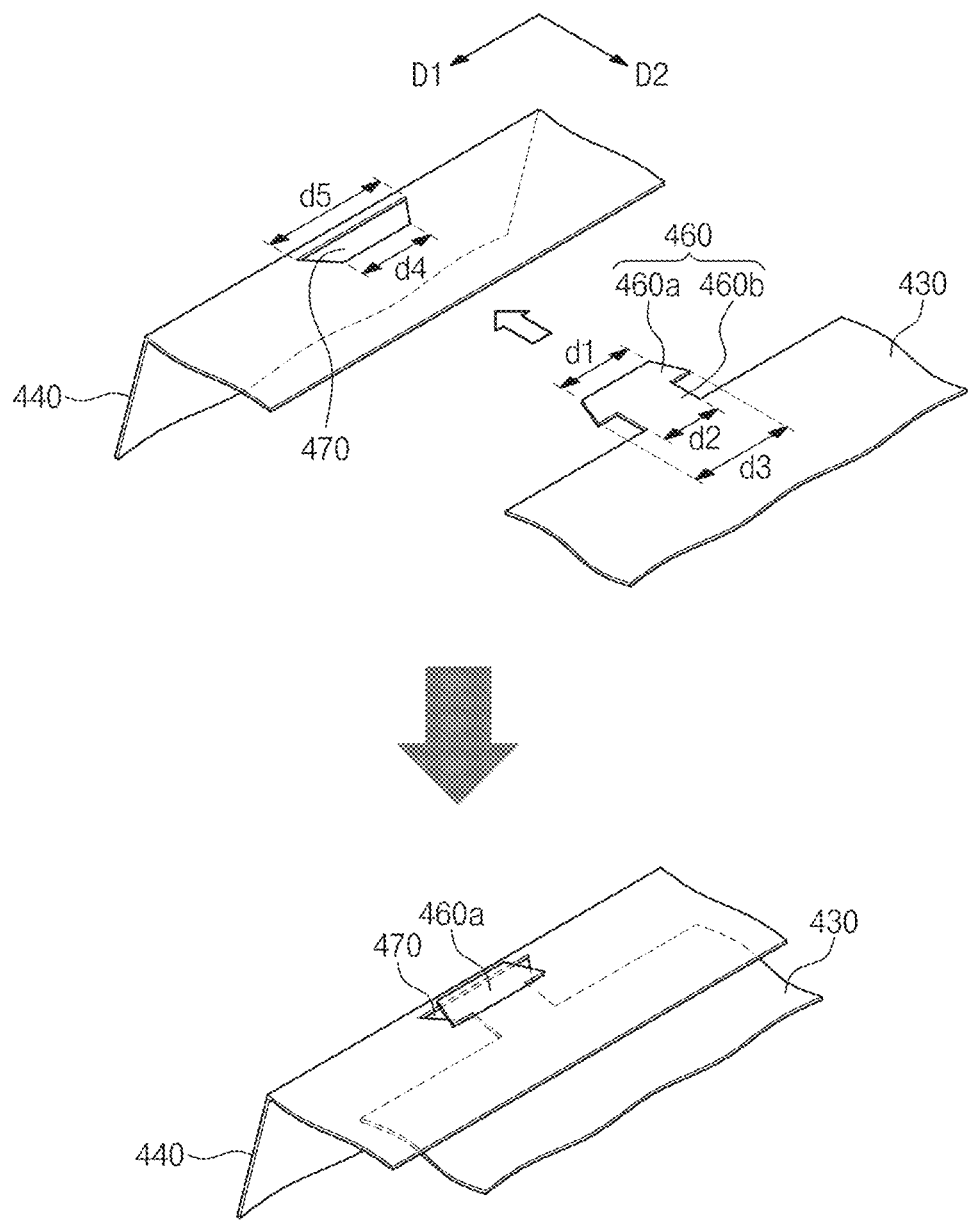
FIG. 4B are enlarged perspective views showing the coupling state of protrusions and engaging holes of the reflection sheet shown in FIG. 4A.

FIG. 4B are enlarged perspective views showing the coupling state of the reflection sheet shown in FIG. 4A.

Referring to FIG. 4B, the protrusion portion 460 includes a head 460a and a connector 460b, the protrusion portion 460 has a portion having a first width d1 and another portion having a third width d3, and a connector 460b has a portion having a second width d2 smaller than the first width d1.

A side of each engaging hole 470 has a fourth width d4 smaller than the first width d1, and another side of each engaging hole 470 has a fifth width d5 greater than the third width d3. The head 460a is inserted into the engaging hole 470 after penetrating through the engaging hole 470 smaller than the first width d1, and the portion of the head 460a having the third width d3 is caught by the portion of the engaging hole 470 having the fourth d4 and fixed to the third sidewall 440.

Only the head 460a of the protrusion portion 460 is inserted into the engaging hole 470 from a lower portion of the third and fourth sidewalls 440 and 450.

When the protrusion portion 460 is inserted into the engaging hole 470 and engaged to the engaging hole 470, the third and fourth sidewalls 440 and 450 are disposed to cover a portion of the sheet bottom portion 430.

Thus, the reflection sheet 400 is integrally formed as a single unitary and individual unit, the coupling stability thereof is improved, and the manufacturing process of the curved display device 500 becomes easier.

Figure 5:
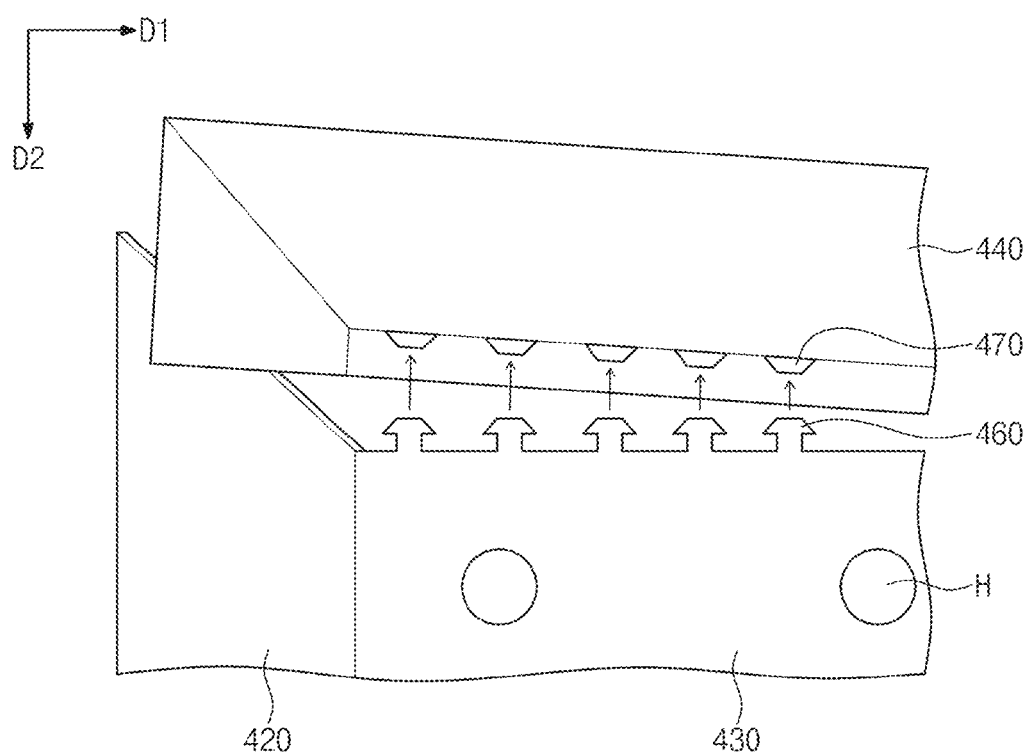
FIG. 5 is an enlarged perspective view showing a coupling state of a bottom portion and sidewalls of a reflection sheet according to another exemplary embodiment of the present disclosure.

FIG. 5 is an enlarged perspective view showing a coupling state of a reflection sheet according to another exemplary embodiment of the present disclosure.

Referring to FIG. 5, a reflection sheet 400 includes a protrusion portion 460 disposed on a sheet bottom portion 430 and an engaging hole 470 formed through a third sidewall 440 and a fourth sidewall 450, which is coupled to the protrusion portion 460.

A size and the number of the protrusion portions 460 and the engaging holes 470 increase as a curvature radius of a display panel becomes greater.

As the curvature radius of the display panel becomes greater, stress applied to the sheet bottom portion 430, the third sidewall 440, and the fourth sidewall 450 increases. Thus, as described in the present exemplary embodiment, when the size and the number of the protrusion portions 460 and the engaging holes 470 increase, the coupling stability between the sheet bottom portion 430, the third sidewall 440, and the fourth sidewall 450 becomes greater.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A curved display device comprising:
   a display panel curved along a first direction; and
   a backlight assembly providing a light to the display panel, the backlight assembly comprising:
      a light source unit comprising a plurality of light sources emitting the light and a plurality of light source substrates electrically connected to the light sources; and
      a containing member accommodating the light source unit, and the containing member comprising:
         a side portion;
         a bottom portion curved along the first direction; and
         a fixing portion defined by cutting and bending a predetermined portion of the bottom portion immediately adjacent to a junction of the bottom portion and the side portion, the fixing portion being coupled to the light source substrates to fix the light source substrates to the bottom portion.

2. The curved display device of claim 1, wherein the fixing portion is defined by cutting a portion of the bottom portion and bending the cut portion of the bottom portion.

3. The curved display device of claim 2, wherein the fixing portion comprises an engaging groove defined by the bent portion, and an end portion of each light source substrate is engaged to the engaging groove.

4. The curved display device of claim 1, wherein each of the light source substrates extends in a second direction crossing the first direction, and the light source substrates are arranged in the first direction on the bottom portion.

5. The curved display device of claim 4, wherein the first direction is substantially perpendicular to the second direction.

6. A curved display device comprising:
a display panel curved along a first direction; and
a backlight assembly providing a light to the display panel, the backlight assembly comprising:
    a light source unit comprising a plurality of light sources emitting the light and a plurality of light source substrates electrically connected to the light sources;
    a containing member accommodating the light source unit; and
    a reflection sheet disposed on the containing member to cover the light source substrates, the reflection sheet comprising holes formed therethrough to accommodate the light sources, wherein the reflection sheet comprises:
        a sheet bottom portion and a plurality of sidewalls extending from the sheet bottom portion,
        a portion of the sidewalls is integrally formed with the sheet bottom portion, and
        the other portion of the sidewalls is coupled to the sheet bottom portion,
    wherein the other portion of the sidewalls includes a first portion extending in a predetermined angle with respect to the sheet bottom portion and a second portion extending parallel to the sheet bottom portion, and the sheet bottom portion is connected to the second portion of the other portion of the sidewalls.

7. The curved display device of claim 6, wherein the sidewalls comprise a first sidewall, a second sidewall, a third sidewall, and a fourth sidewall, the first sidewall, the sheet bottom portion, and the second sidewall are arranged in the first direction to be integrally formed with each other, the third sidewall, the sheet bottom portion, and the fourth sidewall are arranged in a second direction, and the third and fourth sidewalls are coupled to the sheet bottom portion.

8. The curved display device of claim 7, wherein the sheet bottom portion comprises a protrusion portion extending from the sheet bottom portion, and each of the third and fourth sidewalls comprises an engaging hole formed therethrough to be coupled to the protrusion portion.

9. The curved display device of claim 8, wherein the protrusion portion comprises a head having a first width; and a connector connecting the head and the sheet bottom portion and having a second width smaller than the first width, and the engaging hole is smaller than the first width and greater than the second width.

10. The curved display device of claim 9, wherein the head is inserted into the engaging hole after penetrating through the engaging hole smaller than the first width, and the head is caught by the engaging hole to be fixed to the engaging hole.

11. The curved display device of claim 8, wherein a size of the protrusion portion and a number of the protrusion portions increase as a curvature radius of the display panel becomes greater.

12. The curved display device of claim 8, wherein the protrusion portion has a polygonal shape.

* * * * *